US010531099B2

(12) United States Patent
Taylor, Jr. et al.

(10) Patent No.: US 10,531,099 B2
(45) Date of Patent: Jan. 7, 2020

(54) SYSTEMS AND METHODS FOR DISTRIBUTED QUANTIZATION OF MULTIMODAL IMAGES

(71) Applicant: The MITRE Corporation, McLean, VA (US)

(72) Inventors: Robert M. Taylor, Jr., New Market, MD (US); Jeffrey P. Woodard, McLean, VA (US)

(73) Assignee: The MITRE Corporation, McLean, VA (US)

( * ) Notice: Subject to any disclaimer, the term of this patent is extended or adjusted under 35 U.S.C. 154(b) by 0 days.

(21) Appl. No.: 15/282,830

(22) Filed: Sep. 30, 2016

(65) Prior Publication Data

US 2018/0097557 A1    Apr. 5, 2018

(51) Int. Cl.
*H04N 19/176* (2014.01)
*H04N 19/179* (2014.01)
*H04N 19/13* (2014.01)
*H04N 19/94* (2014.01)
*H04N 19/124* (2014.01)
*H04N 19/157* (2014.01)
*H04N 19/463* (2014.01)
*H04N 19/132* (2014.01)

(52) U.S. Cl.
CPC ......... *H04N 19/176* (2014.11); *H04N 19/124* (2014.11); *H04N 19/13* (2014.11); *H04N 19/132* (2014.11); *H04N 19/157* (2014.11); *H04N 19/179* (2014.11); *H04N 19/463* (2014.11); *H04N 19/94* (2014.11)

(58) Field of Classification Search
CPC ........ H04N 19/61; H04N 19/44; H04N 19/52; H04N 19/82; H04N 19/172; H04N 19/119; H04N 19/122; H04N 19/513; H04N 19/196; H04N 19/436; H04N 19/96; H04N 19/126; H04N 19/132
USPC .......................................... 375/241; 341/106
See application file for complete search history.

(56) References Cited

U.S. PATENT DOCUMENTS

| | | | |
|---|---|---|---|
| 2008/0086672 A1* | 4/2008 | Ovchinnikov | H03M 13/356 714/755 |
| 2011/0200125 A1* | 8/2011 | Multrus | H03M 7/3088 375/259 |
| 2012/0099626 A1* | 4/2012 | Inoue | H03M 7/30 375/219 |

* cited by examiner

*Primary Examiner* — David C Payne
*Assistant Examiner* — Sarah Hassan
(74) *Attorney, Agent, or Firm* — Morrison & Foerster LLP

(57) ABSTRACT

A system and method for implementing a distributed source coding quantization scheme is provided. In one example, two independent but statistically correlated data sources can be asymmetrically compressed so that one source is compressed at a higher ratio than the other. The resulting signals are transmitted and decoded by a receiver. The highly compressed source can utilize the non-highly compressed source as side information so as to minimize the compression loss associated with the higher compression ratio. A conditional codebook can be created that not only depends on the highly compressed quantizer, but also depends on the quantized symbol received from the non-highly compressed data source.

42 Claims, 8 Drawing Sheets

SYSTEMS AND METHODS FOR DISTRIBUTED QUANTIZATION OF MULTIMODAL IMAGES

FIELD OF THE DISCLOSURE

This disclosure relates to a system and method for implementing an optimally distributed source quantization algorithm. More specifically, this disclosure relates to systems and methods for encoding correlated images with separate encoders and a common decoder through the development of multi-dimensional codebooks that can allow for increased compression of a single image while minimizing loss of image fidelity during reconstruction of the image by the receiver.

BACKGROUND OF THE DISCLOSURE

Remote sensing platforms such as satellites, drones, etc., often employ multiple sensors to observe a common subject. For instance, a satellite may employ not only a visible spectrum camera, but may also employ an infrared camera to observe portions of the earth. As technology allows for remote sensors to decrease in size, the reduced footprint of sensors can allow for more sensors to be placed on a given platform. However, oftentimes the multiple sensors must compete for bandwidth in order to communicate data to a receiver that can store and use the acquired data. In severely bandlimited channels, many remote sensing platforms may be unable to effectively transmit high-resolution data. Thus, as a given platform employs more sensors, in order for each sensor to transmit its data to a receiver, the data may have to be compressed, thus, leading to lower resolution data.

Because multiple sensors oftentimes are observing identical phenomenon (i.e., looking at the same portion of the earth), there may be a high degree of correlation among the images observed by each individual sensor on a multi-sensor platform. In an attempt to ease the burden on bandwidth-constrained channels, a decoder can be constructed that can take advantage of the correlation between the data collected by two independent sensors, allowing for asymmetric compression of sensor data, which, in turn, allows for optimal bandwidth performance over a given communications channel.

The system can employ a separate encoder for each source of data but on the receiver end employ a single decoder that utilizes distributed source coding that can maximally exploit dependence across sensors to dramatically reduce transmission requirements for a given sensor of a multi-sensor platform.

SUMMARY OF THE DISCLOSURE

Accordingly, a system and method for implementing an optimally distributed source quantization algorithm is provided. The system and method can include multiple independent encoders to encode each remote sensor data stream but a common decoder that utilizes a multi-dimensional codebook that takes advantage of the high degree of correlation between the sensor data. The multi-dimensional conditional codebook can allow for one of the data streams to be highly compressed with minimal loss. The decoder codebook can be generated via a training process wherein a series of test samples are provided so as to create a conditional codebook.

BRIEF DESCRIPTIONS OF THE DRAWINGS

FIG. 1a-b illustrates exemplary image sensor platforms with their corresponding ground stations according to examples of the disclosure.

DETAILED DESCRIPTION

Figure 1B:
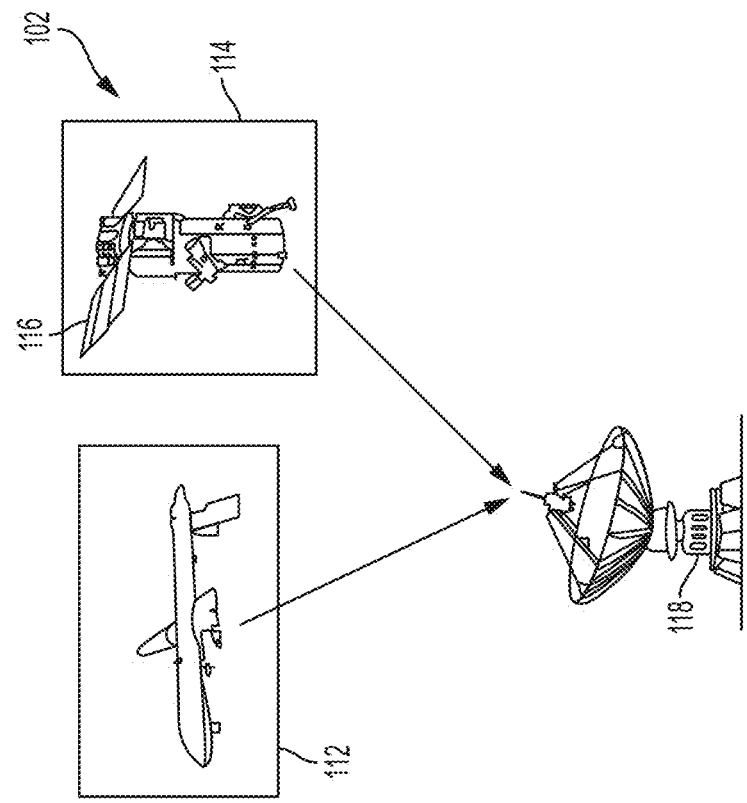

Described herein are systems and methods for implementing a distributed source coding scheme upon two data sources that are independent and statistically correlated to one another. The systems and methods described herein can be used to allow for asymmetric compression of two independent but statistically correlated sources while minimizing quantization error at the decoder.

The systems and methods employ a joint decoder that allows for a first data source to be decoded using conventional methods and then decodes a second source using a conditional codebook that is created during a training process. By generating and employing a conditional codebook to decode the second source, the second source can be compressed at a higher compression ratio while minimizing the loss experienced during decoding.

Increasing the compression ratio of the second source can also provide benefits to bandlimited communications channels. As an example, an asymmetric compression scheme in which one source is compressed at a significantly higher ratio than a second source can decrease the overall bandwidth of a signal. In remote sensing applications, this reduction in the bandwidth of the signal can ensure improved communications with ground stations or other receivers of remote sensing data.

In severely bandlimited channels, many remote sensing platforms may be unable to effectively transmit high-resolution data. Often these platforms are equipped with multiple sensing modalities that share strong statistical strength among the produced data by virtue of the same underlying phenomena being observed. Although there is a high degree of correlation among the different sensing modalities, current codecs do not exploit this important side information for compression and, instead, rely on non-cooperative codecs. However, by employing distributed source coding (as discussed below), a system can maximally exploit dependence across sensors to dramatically reduce transmission requirements for a given sensor participating in the cooperative distributed coding paradigm. Other application spaces for distributed source coding of images include automotive sensing, future personal electronic devices, robotics, and stereo/multiview cameras.

In the following description of the disclosure and embodiments, reference is made to the accompanying drawings in which are shown, by way of illustration, specific embodiments that can be practiced. It is to be understood that other embodiments and examples can be practiced, and changes can be made without departing from the scope of the disclosure.

In addition, it is also to be understood that the singular forms "a," "an," and "the," used in the following description, are intended to include the plural forms as well, unless the context clearly indicates otherwise. It is also to be understood that the term "and/or," as used herein, refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic, or optical signals capable of being stored, transferred, combined, compared, and otherwise manipulated. It is convenient at times, principally for reasons of common usage, to refer to these signals as bits, values, elements, symbols, characters, terms, numbers, or the like. Furthermore, it is also convenient at times to refer to certain arrangements of steps requiring physical manipulations of physical quantities as modules or code devices without loss of generality.

However, all of these and similar terms are to be associated with the appropriate physical quantities and are merely convenient labels applied to these quantities. Unless specifically stated otherwise, as apparent from the following discussion, it is appreciated that, throughout the description, discussions utilizing terms such as "processing," "computing," "calculating," "determining," "displaying," or the like refer to the action and processes of a computer system or similar electronic computing device that manipulates and transforms data represented as physical (electronic) quantities within the computer system memories or registers or other such information storage, transmission, or display devices.

Certain aspects of the present invention include process steps and instructions described herein in the form of an algorithm. It should be noted that the process steps and instructions of the present invention could be embodied in software, firmware, or hardware and, when embodied in software, could be downloaded to reside on and be operated from different platforms used by a variety of operating systems.

The present invention also relates to a device for performing the operations herein. This device may be specially constructed for the required purposes, or it may comprise a general-purpose computer selectively activated or reconfigured by a computer program stored in the computer. Such a computer program may be stored in a non-transitory, computer-readable storage medium, such as, but not limited to, any type of disk, including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods, devices, and systems described herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein.

Figure 1A:
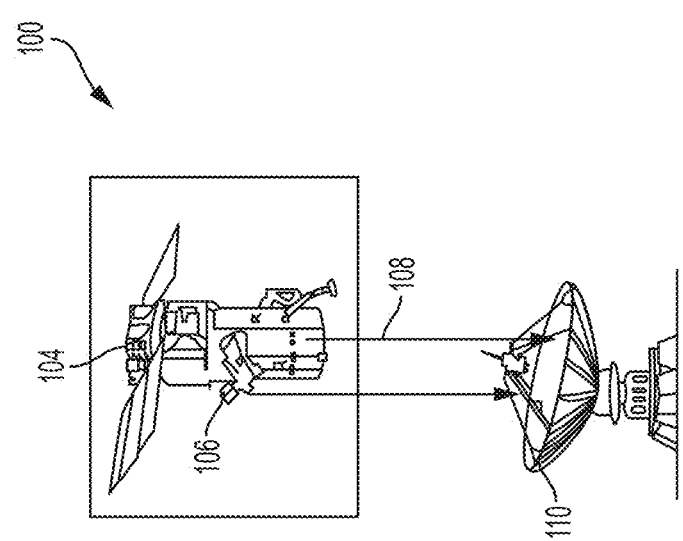

FIG. 1a-b illustrates exemplary image sensor platforms with their corresponding ground stations according to examples of the disclosure. FIG. 1a illustrates an exemplary satellite with a remote sensing platform according to examples of the disclosure. The remote sensing platform 100 can be implemented on a satellite 104. The satellite 104 can include two remote sensors 106 and 108 that can communicate wirelessly with a ground station 110. FIG. 1b illustrates another exemplary remote sensing system. In the example of FIG. 1b, the remote sensing system 102 can include an unmanned aerial vehicle (UAV) with a remote sensor 112 as well as a satellite 116 that includes a remote sensor 114. The UAV-mounted remote sensor 112 and the remote sensor 114 included on satellite 116 can both communicate to a common ground station 118.

Returning to the example of FIG. 1a, remote sensors 106 and 108 may be viewing the same or similar image of the earth below (not pictured) but may be recording different types of information. For instance, remote sensor 106 can be taking a visible spectrum image while remote sensor 108 may be taking nearly the exact same image as 106 but in the infrared spectrum. Likewise, in FIG. 1b, remote sensor 112 can be taking a visible spectrum image of a portion of the earth, while remote sensor 114 can be taking nearly the exact same image as 112 but in the infrared spectrum.

Figure 2:
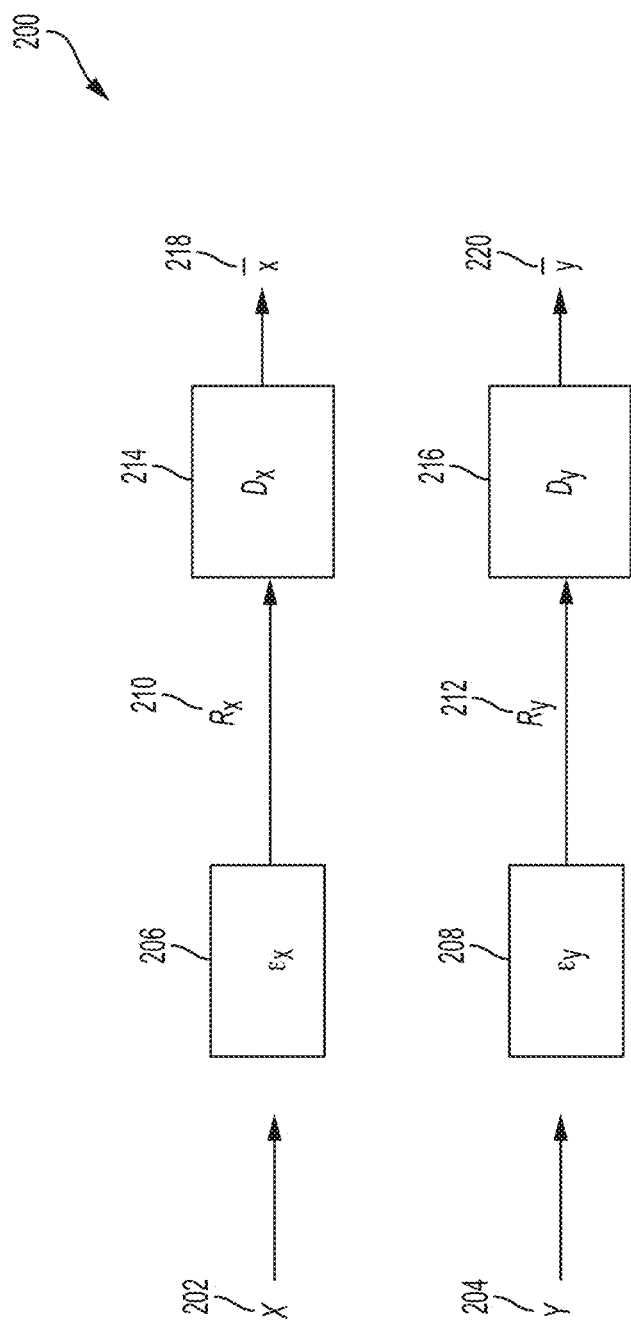
FIG. 2 illustrates an exemplary source encoder and decoder system according to examples of the disclosure.

FIG. 2 illustrates an exemplary source encoder and decoder system according to examples of the disclosure. The system 200 illustrated in FIG. 2 can be used in conjunction with the remote sensing platforms discussed with respect to FIGS. 1a and 1b. Using FIG. 1a as an example, the data generated by remote sensor 106 can be represented as data 'X' 202, while the data generated by remote sensor 108 can be represented by data 'Y' 204. Both streams of data 202 and 204 can be separately encoded by encoders 206 and 208.

Encoders 206 and 208 can encode the data generated by remote sensors 106 and 108, respectively, to prepare the data for transmittal to a remote receiving station. As an example, encoders 206 and 208 can implement quantization of the data (i.e., a lossy compression technique) that can convert the data acquired by the remote sensors 106 and 108 into discrete digital symbols.

The transmitted data 210 and 212 can be received and decoded by decoders 214 and 216, respectively. Decoders 214 and 216 can implement conventional codeword decoding, in which received values are mapped to a codeword. In one example, the decoders 214 and 216 can map received data symbols to its nearest codeword using conventional techniques such as Euclidean distance (i.e., Voronoi cell) decoding.

In the example of FIG. 2, data source 202 and data source 204 can be encoded using separate encoders and decoded using separate independent decoders. Using separate encoders and decoders can mean that the total bandwidth of the signal transmitted to a remote receiver can be based on the joint entropy of both data sources (i.e., the number of bits required for lossless compression).

One method to minimize the bandwidth required to transmit a given signal can be to compress one or more of the data sources (i.e., quantize the data using less bits). However, such a technique can lead to an unacceptable amount of error when the signal is ultimately reconstructed at the decoder and could lead to perceptible visual distortions (in the case of image data).

Returning to the example of FIG. 1a, it can be noted that although remote sensors 106 and 108 are independent data sources, since they are looking at substantially the same portion of the earth, the independent data sources may be statistically correlated. In other words, it can be noted that the data being acquired by remote sensors 106 and 108 can be characterized as statistically dependent, and the images produced by remote sensors 106 and 108 can be spatially aligned with one another as they are essentially viewing the same image. A system that can take advantage of this correlation can allow for asymmetric compression in which one data source is highly compressed but is decoded using information generated by the other data source. Implementing such a system can allow for a data source to be highly compressed while at the same time minimizing the loss associated with high compression. Such a system can be implemented using a joint decoder as discussed in detail below.

Figure 3:
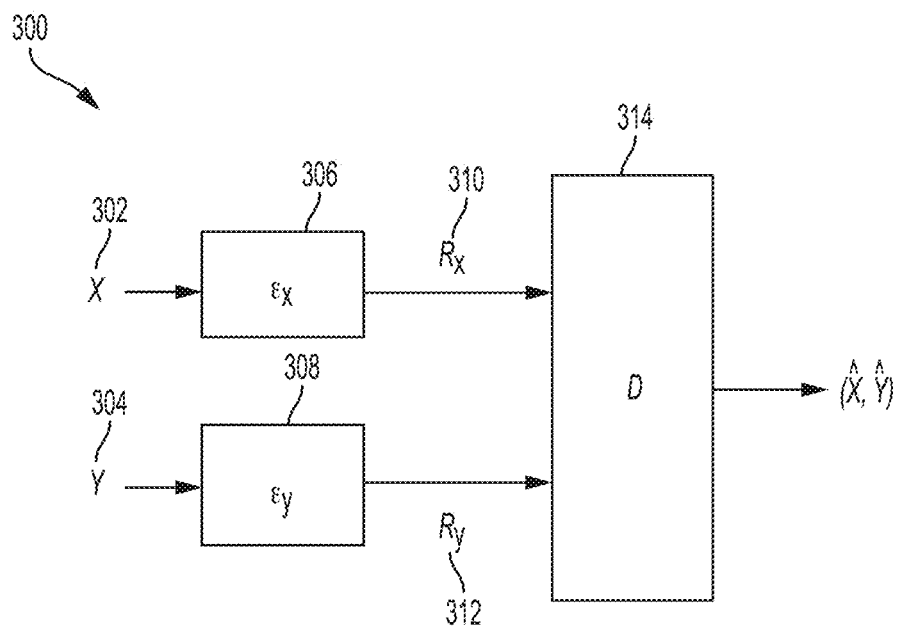
FIG. 3 illustrates an exemplary source encoder and joint decoder system according to examples of the disclosure.

FIG. 3 illustrates an exemplary source encoder and joint decoder system according to examples of the disclosure. In the example of FIG. 3, system 300 can include two separate data sources 302 and 304 (labeled 'X' and 'Y,' respectively). Data sources 302 and 304 can represent data acquired by independent remote sensing platforms. Like in the example of FIG. 2, each data source can be independently encoded. Thus, in the example of FIG. 3, data sources 302 and 304 can be independently encoded by encoders 306 and 308, respectively. Once the data sources have been encoded, each data source 302 and 304 can be transmitted to a remote receiver. In contrast to the example of FIG. 2, rather than being received by separate decoders, transmitted signals 310 and 312 (representing the transmission of encoded data source 302 and 304, respectively) can be received by a joint decoder. Utilizing separate independent encoders for each data source while using a common decoder can still achieve joint entropy across all sources just as if there was a common encoder.

Using one source as "side" information can include building a multi-dimension conditional codebook (discussed below) that takes into account the information from the non-highly compressed source to decode the highly compressed source.

Figure 4:
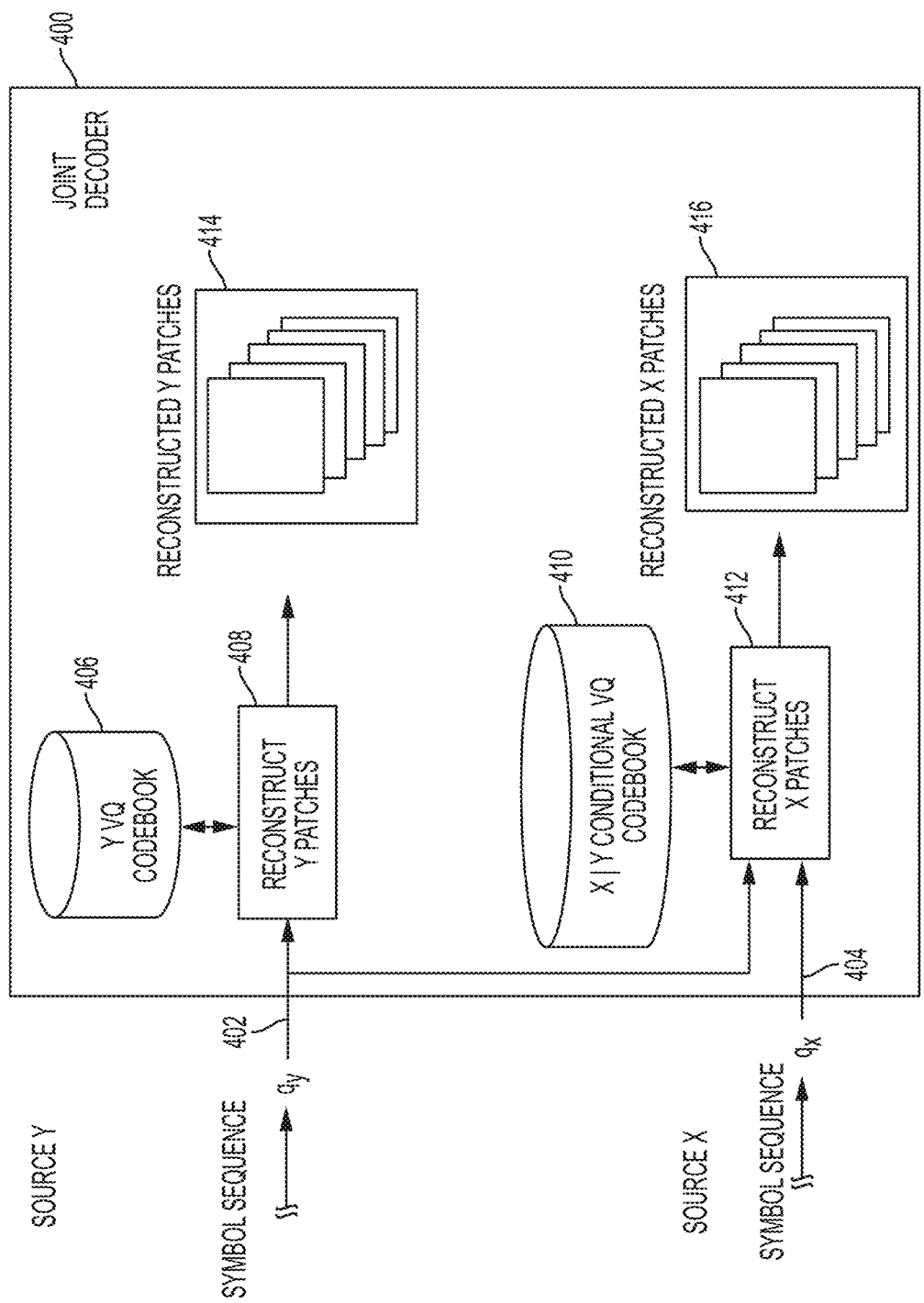
FIG. 4 illustrates an exemplary joint decoder according to examples of the disclosure.

FIG. 4 illustrates an exemplary joint decoder according to examples of the disclosure. In the example of FIG. 4, joint decoder 400 can be configured to reconstruct two images that have been acquired from two separate and independent sources. While independent, the data sources can be correlated to one another as discussed above. Symbol sequence 402 can represent data acquired from a first data source (labeled 'Y' in the figure), while symbol sequence 404 can represent data acquired from a second data source (labeled 'X' in the figure). The source data used to generate symbol sequence 404 can be highly compressed in comparison to the source data used to generate symbol sequence 402 such that the symbol rate of symbol sequence 402 is substantially lower than the symbol rate of symbol sequence 404.

Symbol sequence 402 (i.e., the low compression signal) can be received by the joint decoder 400 and processed by reconstruction module 408. In the example of image processing, symbol sequence 402 can represent one or more image patches that form an image acquired by a remote sensing platform such as a camera. Reconstruction module 408 can receive image data via symbol sequence 402 and attempt to reconstruct the original image based on the received data. The reconstruction module 408 can utilize a codebook 406 in order to reconstruct the images from the received data.

When reconstruction module 408 receives a symbol from symbol sequence 402, it can compare the received symbol to the codewords in the codebook to determine which codeword the received symbol most closely maps to. In one example, the mapping can be accomplished by finding the codeword with the minimum Euclidean distance to the received symbol. In another example, a Voronoi diagram can be created, and the received symbol can be mapped to the centroid of the cell in which the received symbol lies.

The codebook 406 can be generated, in one example, by implementing a generalized Lloyd algorithm. In the generalized Lloyd algorithm, the codebook can "learn" the optimal code mappings based on a plurality of training samples provided during a training process. Optimal code mappings can refer to the creation of Voronoi cells and centroids within the Voronoi cells so as to minimize the mean square error when a received symbol is mapped to a specific codeword in the codebook. The Lloyd algorithm can be implemented by initially choosing a plurality of digitized symbols from the training image data (conventionally referred to as k sites). The Voronoi diagram of the k sites is then computed. Once the Voronoi diagram is calculated, each cell of the Voronoi diagram can be integrated, and the centroid of each cell in the diagram can be computed. The k sites can then be shifted to the computed centroids, and the process can be repeated wherein a new Voronoi diagram can be created for the new k sites, the centroids of each cell are calculated, and the k sites are then shifted to the newly computed centroids. The process outlined above can be repeated numerous times until eventually the k sites will converge to a static value (i.e., doesn't change each iteration) indicating that the Voronoi diagram has converged to find the optimal codebook.

Returning to the example of FIG. 4, symbol sequence 404 (i.e., the highly compressed signal) can be received by the joint decoder 400 and processed by reconstruction module 412. In the example of image processing, symbol sequence 404 can represent one or more image patches that form an image acquired by a remote sensing platform such as a camera. Reconstruction module 412 can receive image data via symbol sequence 404 and attempt to reconstruct the original image based on the received data. The reconstruction module 412 can utilize a codebook 410 in order to reconstruct the images from the received data.

Like reconstruction module 414, when reconstruction module 412 receives a symbol from symbol sequence 404, it can compare the received symbol to the codewords in the codebook to determine which codeword the received symbol most closely maps to. In one example, the mapping can be accomplished by finding the codeword with the minimum Euclidean distance to the received symbol. In another example, a Voronoi diagram can be created, and the received symbol can be mapped to the centroid of the cell in which the received symbol lies.

In contrast to symbol sequence 402, as symbol sequence 404 is highly compressed, in order to decode it while minimizing the loss associated with high compression, the codebook used to decode the received symbol sequence 404 can include "side information" from symbol sequence 402 in order to reconstruct the image. In order to incorporate the side information, a multidimensional codebook can be generated that depends on the statistical dependencies of symbol sequences 402 and 404. A symbol from symbol sequence 404 can be decoded based on a corresponding symbol received from symbol sequence 402 and a conditional codebook that is based on the correlation between symbol sequence 402 and symbol sequence 404. Thus, as illustrated in FIG. 4, the reconstruction module 412 not only receives the symbol sequence 404 and the conditional codebook 410, but also receives symbol sequence 402. In this way, the reconstruction module can determine the current symbol of symbol sequence 402 and then decode the symbol of symbol sequence 404 based on the received symbol of sequence 404 and the conditional codebook 410.

In order to conceptualize a multi-dimensional conditional codebook, an example is provided in which two data sources are being encoded and decoded. As discussed above, the two sources X and Y can be asymmetrically encoded such that $R_y \gg R_x$ ($R_y$=number of bits used to encode data source Y, and $R_x$=number of bits used to encode data source X). In other words, the number of bits used to encode data source Y can be greater than the number of data bits used to encode data source X. In the example, X can represent the highly compressed data source and can take on either of two values {1, 2}. Y can represent the less compressed data source and can take on one of four values {1, 2, 3, 4}. Table 1, provided below, illustrates an exemplary codebook given the above parameters. As shown in the table, the codebook can be represented by a two-dimensional table in which the rows of the table indicate values of X, and the columns of the table indicate values of Y. Thus, under the parameters described above, the codebook can have two rows (representing the two possible values of X) and four columns (representing the four possible values of Y).

TABLE 1

| X\|Y | Y = 1 | Y = 2 | Y = 3 | Y = 4 |
|---|---|---|---|---|
| X = 1 | $C_{11}^{X1Y}$ | $C_{12}^{X1Y}$ | $C_{13}^{X1Y}$ | $C_{14}^{X1Y}$ |
| X | $C_{21}^{X1Y}$ | $C_{22}^{X1Y}$ | $C_{23}^{X1Y}$ | $C_{24}^{X1Y}$ |

The values of each cell in the table can represent the centroids of a conditional Voronoi cell. For instance, $C_{11}^{X1Y}$ can represent the centroid of a Voronoi cell for when X is quantized with index 1 given that Y is quantized with index 1. $C_{12}^{X1Y}$ can represent the centroid of a Voronoi cell for when X is quantized with index 1 given that Y is quantized with index 2. $C_{21}^{X1Y}$ can represent the centroid of a Voronoi cell for when X is quantized with index 2 given that Y is quantized with index 1. $C_{24}^{X1Y}$ can represent the centroid of a Voronoi cell for when X is quantized with index 2 given that Y is quantized with index 4, and so on and so forth.

The example codebook illustrated in Table 1 and described above can be applied to the example of FIG. 4. Let $q_x$=the symbol sequence 404 and $q_y$=symbol sequence 402. The joint decoder 400 can receive both symbol sequences 402 and 404. At reconstruction module 408, symbol sequence 402 can be decoded (i.e., reconstructed) using a codebook 406, which can be constructed as described above. Reconstruction module 412 can receive both symbol sequences 402 and 404 and use codebook 410 (i.e., Table 1) to decode symbol sequence 404. For instance, if symbol sequence 404 (i.e., $q_x$) yields a 1 while symbol sequence 402 (i.e., $q_y$) yields a 4, then reconstruction module 412 can decode the symbol sequence 404 by decoding it to $C_{14}^{X1Y}$, which as described above can represent the centroid of a Voronoi cell for when $q_x$=1 given that $q_y$=4.

As discussed above, the codebook 406 for symbol sequence 402 can be learned independently using the Lloyd algorithm. Calculating the centroids of each cell in the conditional codebook 410 can include utilizing a distributed Lloyd algorithm described as follows. Initially, the optimal reconstruction of X can be given by equation 1:

$$c_x(q_x, y) = \operatorname{argmin}_x E[d(x, \hat{x}) | q_x, y] \quad (1)$$

Equation 1 illustrates the relationship of the conditional codebook $c_x(q_x, y)$ to expectation of the distortion function $d(x,x)$ given the quantization index of x ($q_x$) and the vector y. Although any arbitrary distortion measure can be used in equation 1 above, in one example mean square error can be used to measure distortion. Mean square error can be defined in equation 2:

$$D_x = \frac{1}{n} E\left[\sum_{i=1}^{n}(x_i - \hat{x}_i)^2\right] \quad (2)$$

Equation 2 can represent the distortion for the X symbol sequence $[X_1, X_2, X_3 \ldots X_n]$. Thus, rewriting equation 1 to account for the use of mean square error as the distortion measure can yield equation 3:

$$c_x(q_x, q_y) = E[x | q_x, q_y] \quad (3)$$

$C_x(q_x, q_y)$ can represent the optimal codeword used by the reconstruction module 412 given a received symbol $q_x$ from symbol sequence 404 and given a received symbol $q_y$ from symbol sequence 402. Equation 3 can represent the optimal reconstruction (i.e., codebook value) given the quantizer.

The optimal quantization given a particular codebook value can be expressed using equation 4.

$$q_x = \operatorname{argmin}_{\alpha \in Q_x} \|x - c_x(\alpha, q_y)\| \quad (4)$$

It can be readily apparent from equation 3 that the codebook can be a function of the quantization indices from both data sources (i.e., the two correlated but independent data sources), thus, making the codebook a two-dimensional codebook with one dimension representing the quantized X value and the other dimension representing the quantized Y value. However, while determining the optimal quantization in equation 4, only the quantization index for X is updated. The quantization index for Y (i.e., $q_y$), which is computed independently of X (see discussion above), tells us which column of Table 1 the closest centroid will lay. Thus, only the row index can be encoded to satisfy the nearest neighbor condition.

Due to this fact, the large compression gain that can be associated with employing a multidimensional conditional codebook can be realized. For instance, only $2^{n(Rx+Ry)}$ codewords can be acquired, but only $2^{nRx}$ bits can be required to encode X.

In order to implement the distributed Lloyd algorithm, equations 3 and 4 can be iterated until a solution for the optimal quantization index and the optimal codebook is converged upon. Thus, in equation 3 a codebook can be generated given the quantization indices of X in the training sample, the corresponding unencoded vectors of X in the training sample, and the corresponding quantization indices of Y. Once the optimal codebook is generated using the parameters given above, equation 4 can be used to find the optimal quantization index for X given the codebook generated in equation 3 and the corresponding quantization indices of Y).

The distributed Lloyd algorithm described above can be iterated over a pre-determined number, wherein the pre-determined number selected is high enough to ensure a reasonable amount of convergence for both the quantization index of X as expressed by equation 4 and the optimal codeword given a quantization index for X and the quantization index for Y.

Figure 5:
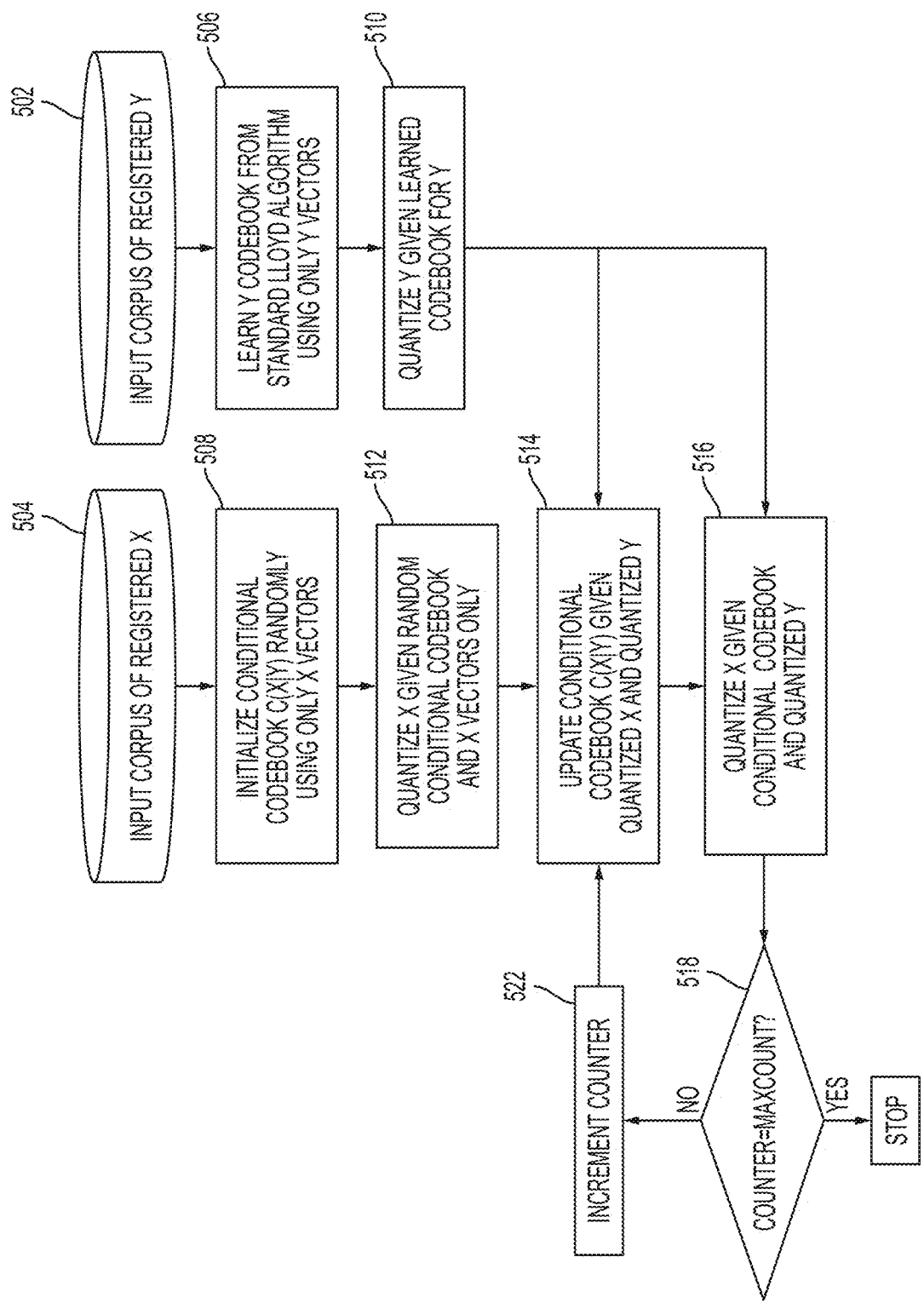
FIG. 5 illustrates an exemplary method for determining a multi-dimension codebook according to examples of the disclosure.

FIG. 5 illustrates an exemplary method for determining a multi-dimension codebook according to examples of the disclosure. At step 502 a registered image Y is inputted. The registered image Y can include a plurality of vectors which can be described as training sequences that can be used to learn the optimal codebook for a data source associated with the registered image Y. At step 504 a registered X image is inputted. The registered image X can include a plurality of vectors which can be described as training sequences that can be used to learn the optimal codebook for a data source associated with the registered image X. As discussed above, the registered images X and Y can be taken from independent data sources that are statistically correlated and spatially aligned.

At step 506 the Y codebook can be learned. As discussed above, the Y codebook (i.e., the codebook for the lower compressed source) can be learned using the Lloyd algorithm and the vectors acquired from the registered Y image. Additionally, at step 510, each vector from the source Y can be encoded using a nearest neighbor vector quantization (VQ) search. The result of step 508 can be a stream of integer symbols $q_y \varepsilon Q_y$. The integers can represent the closest codeword in the y codebook to each y codebook. The training of the y codebook and subsequent encoding can be done only once.

At step 508 the conditional codebook can be initialized using only the vectors acquire at step 504 from the registered image X. The result can also be a stream of integer symbols $q_x \varepsilon Q_x$. The initial creation of a conditional X codebook can be done with any method including random assignment. In one example, the initial conditional codebook of X can be generated using the Lloyd algorithm to learn a VQ codebook based on the X vectors acquired at step 504.

At step 512, given the initialized conditional codebook generated at step 508, the X vectors acquired at step 504 can be quantized using only the X vectors acquired at step 504. The process can then move to step 514 wherein an optimized codebook can be determined given the initialized codebook determined at step 508, the quantized X value from step 512, and the corresponding quantized Y value acquired at step 510. The conditional codebook can be determined in accordance with equation 3 described above.

Using the optimized conditional codebook determined at step 514 and the corresponding Y vectors acquired at step 510, the X vectors acquired at step 504 can re-quantized.

The quantization values for the X vectors can be determined in accordance with equation 4 described above.

The process can move to step 518 wherein a counter can be compared to a pre-determined value. If the counter equals the pre-determined value, the process can be halted at step 520. If the counter does not equal the pre-determined value, the counter can be incremented at step 522, and the process can revert to step 514 wherein the optimal quantizer determined at step 516 can be used to determine the optimal codebook. In this way, steps 514 and 516 can be iterated enough times so that the optimal codebook and the optimal quantizer converge to a solution that ultimately can lead to the optimal multidimensional codebook for X that is based also on Y.

In order to ensure that overfitting does not occur, there should be a sufficient number of vectors of X and Y in each cell of Table 1. As an example, 30 vectors per cell has been found empirically to be a reasonable number.

During the codebook training phase, it can be assumed that there are registered samples of all image patches (x and y for the two-dimensional case). It is important to note that the simultaneous sources X and Y are available only at training time (i.e., when the codebooks are being generated). When the decoder is being used during system operation, the sources may not be able to communicate.

Due to this fact, the large compression gain that can be associated with employing a multidimensional conditional codebook can be realized.

The examples above have been presented using two-dimensional examples in which there are two independent but statistically correlated sources; however, the disclosure should not be construed as limited to two-dimensional examples and can also be applied to multi-dimensional examples in which there are more than two independent but statistically correlated sources.

As an example, equation 5 can represent the formula to obtain the optimal codebook for a three-source system (X, Y, and Z) given the quantization indices for each source.

$$c_x(q_x,q_y,q_z)=E[x|q_x,q_y,q_z]$$

$$c_y(q_x,q_y,q_z)=E[y|q_x,q_y,q_z] \quad (5)$$

Equation 6 can represent the formula to obtain the optimal quantizer for a three-source system (X, Y, and Z) given the codebook for each source.

$$q_x=\mathrm{argmin}_{\alpha \in Q_x}\|x-c_x(\alpha,q_y,q_z)\|$$

$$q_y=\mathrm{argmin}_{\beta \in Q_y}\|y-c_y(q_x,\beta,q_z)\| \quad (6)$$

Figure 6:
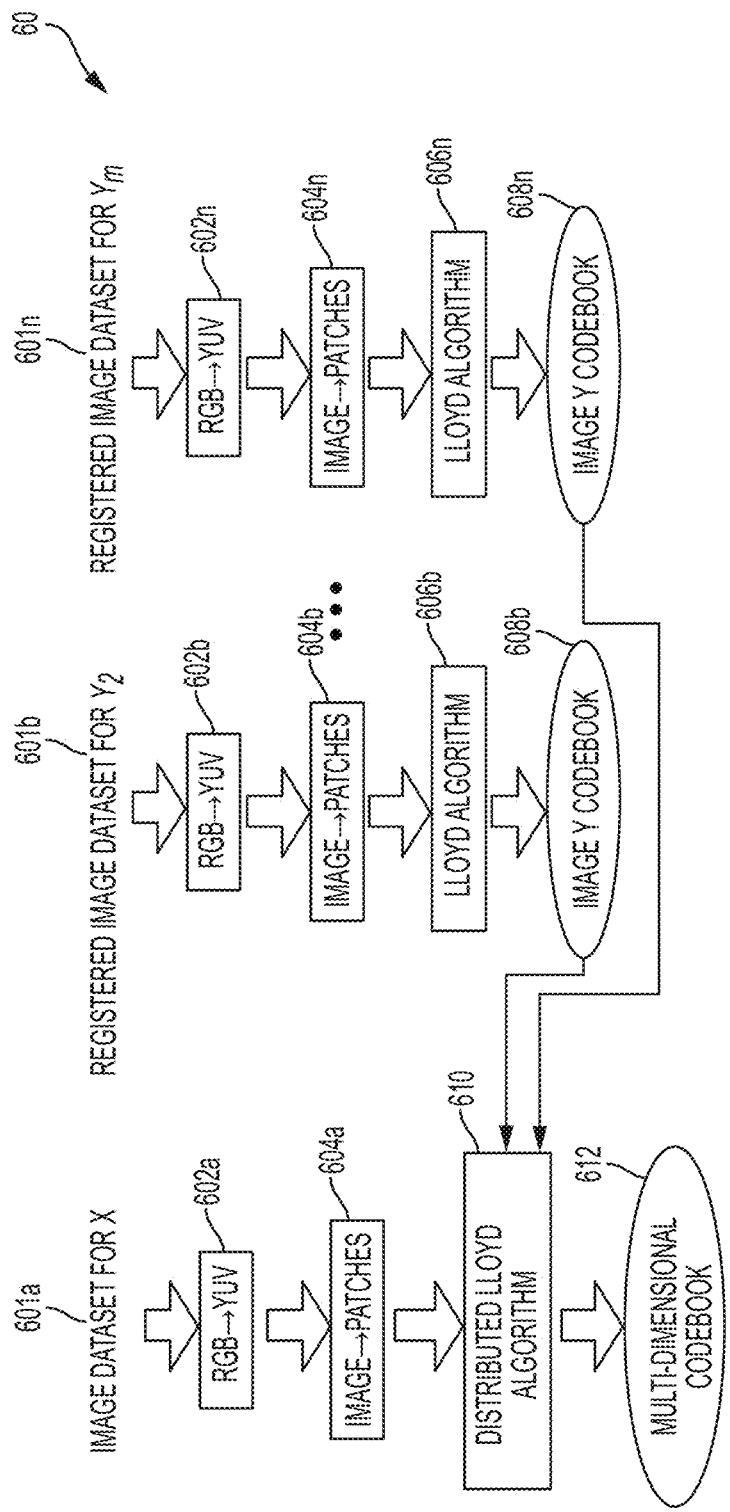
FIG. 6 illustrates an exemplary multidimensional codebook training process flow chart according to examples of the disclosure.

FIG. 6 illustrates an exemplary multidimensional codebook training flow chart according to examples of the disclosure. The example flow diagram 600 can represent the process for creating an n-dimensional codebook using the distributed Lloyd algorithm described above. At steps 601a, 601b, and 601n registered image data sets can be inputted for source X and sources $Y_1$ to $Y_n$, respectively.

At steps 602a to 602n, the inputted images are color-space converted from the RGB color space to the YUV color space. At steps 604a to 604n, each image is then decomposed into overlapping patches. In one example, each image can be converted into overlapping 16×16 image patches. It should be noted that the image patches are not overlapped during image reconstruction (not pictured). At 606b to 606n, the Lloyd algorithm can be applied to each training image set and producing a codebook for each data source at 608b to 608n. At 610, each codebook generated at 608b to 608n can be used to implement the distributed Lloyd algorithm, finally producing a multi-dimensional conditional codebook for X at 612.

Adapting the above system and methods for distributed source coding to preexisting ground station hardware and sensor firmware can include minimal effort. For instance, adapting a ground station to implement distributed source decoding can include swapping out a preexisting software decoder with a decoder that implements distributed source decoding. Swapping out, in some examples, can include installing new software on the ground station.

With respect to adapting a preexisting sensor to implement distributed source coding, the encoder firmware can be swapped with distributed encoder firmware.

An example of results obtained using the systems and methods discussed above is provided below. The example discussed below is provided for illustrative purposes and should not be construed as limiting the disclosure in any way.

Example Results

Figure 7:
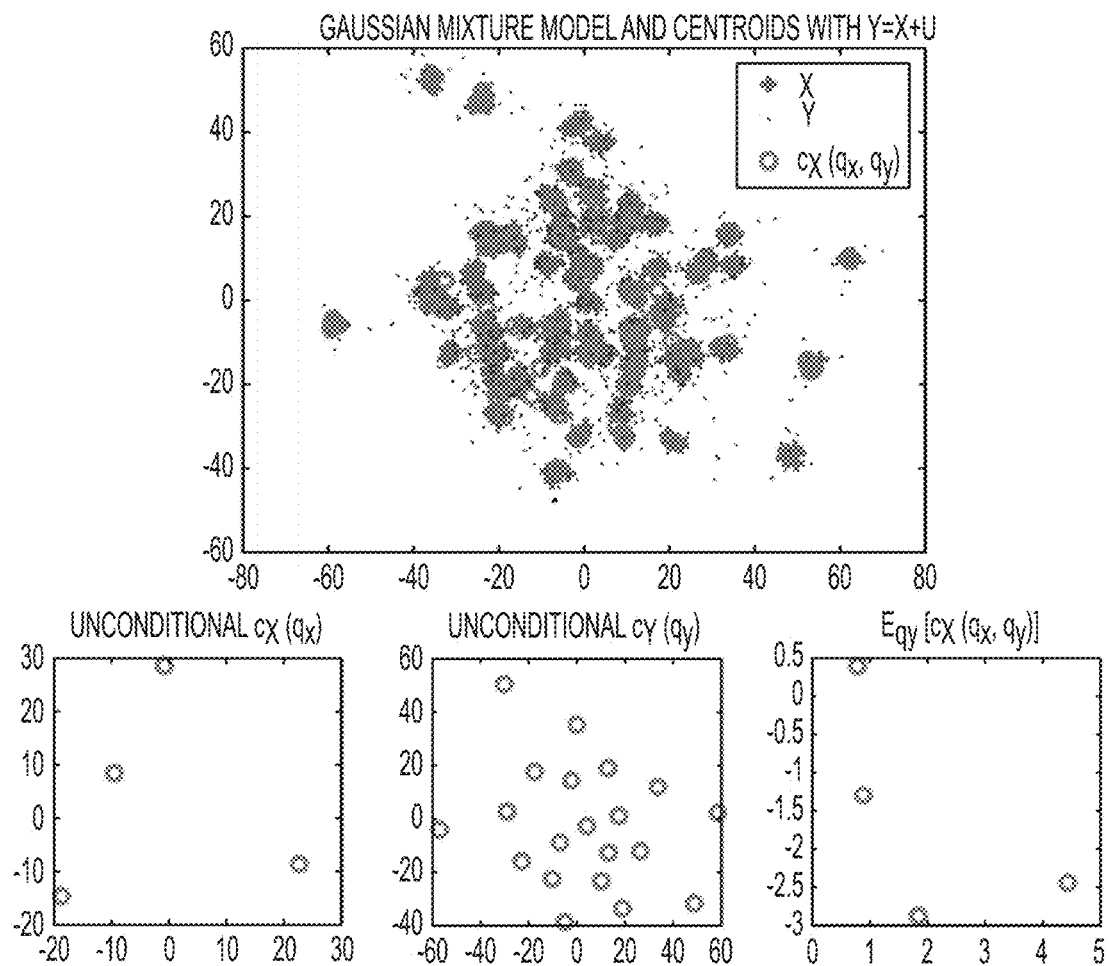
FIG. 7 illustrates an exemplary result of implementing distributed source coding to an encoder and decoder system according to examples of the disclosure.

FIG. 7 illustrates a simple 2-D Gaussian mixture model of image data with overlaid centroids. In this example, we model data source X using equation 7.

$$x \sim \frac{1}{K}\sum_{k=1}^{K} \mathcal{N}(\mu_k, \sigma_k^2 I), u \sim \mathcal{N}(0, \sigma_u^2 I), \text{ and } y = x + u. \quad (7)$$

We assign four codewords to X, 20 codewords to Y, and, therefore, have a conditional codebook X|Y with 80 codewords. We use this example to gain visual understanding as to how the multidimensional codebook distributes the codewords in each cell to gain a much higher effective sampling of the observation space at no additional cost in rate to the source X encoder. In the top scatter plot in FIG. 7 we overlay the converged centroids of the two-dimensional codebook $c_X(q_X; q_Y)$ learned from equations (3) and (4). We observe that the two-dimensional codebook centroids very accurately sample the observation space of X. In the bottom scatter plots of FIG. 7 we overlay the unconditional codebooks (no multi-dimensional training) for X and Y as well as the marginalized codebook for X after multi-dimensional training. In comparing the graph labeled "unconditional Cx" with the graph labeled $E_{q_Y}$, we see that learning the conditional codewords for X greatly changes the codewords.

The changes in the codewords discussed above can mean that using information gleaned from the decoding of Y can have a significant impact on the reconstruction of X since the codewords that use information gleaned from the decoding of Y as side information can lead to a more accurate reconstruction of the original data. In terms of image processing (for instance on images taken from satellites), this can mean that despite a high compression ratio, a data source can be more accurately reconstructed if a second statistically correlated source can be used as side information when creating a codebook to decode the highly compressed data source.

Thus, in view of the above presented systems and methods, as well as the example results provided above, it can be seen that Vector quantization (VQ) for lossy compression is able to exploit dependencies among vector elements—even nonlinear ones. For two multi-terminal source coding, VQ is also able to exploit dependencies between sources. This inter- and intra-dependency modeling capability makes VQ ideally suited to distributed source quantization. It is fairly well known that infinite dimensional VQ can approach the rate distortion bound, and this points to VQ as a foundational approach to approaching the bounds of multi-terminal coding. In some examples, structured VQ can allow for ultra-high dimensional codebooks while still maintaining computational and storage feasibility.

Figure 8:
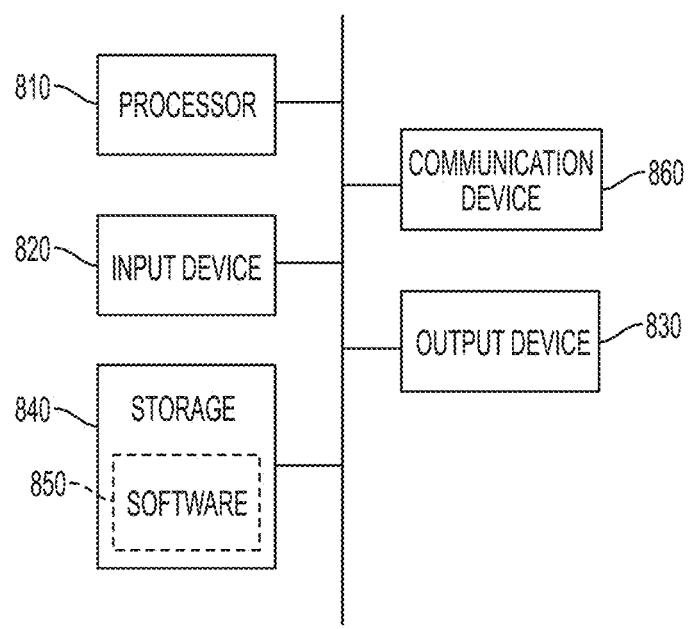
FIG. 8 illustrates an example of a computing device in accordance with one embodiment.

FIG. 8 illustrates an example of a computing device in accordance with one embodiment. Device 800 can be a host computer connected to a network. Device 800 can be a client computer or a server. As shown in FIG. 8, device 800 can be any suitable type of microprocessor-based device, such as a personal computer, work station, server, or handheld computing device (portable electronic device), such as a phone or tablet. The device can include, for example, one or more of processor 810, input device 820, output device 830, storage 840, and communication device 860. Input device 820 and output device 830 can generally correspond to those described above and can either be connectable or integrated with the computer.

Input device 820 can be any suitable device that provides input, such as a touchscreen, keyboard or keypad, mouse, or voice-recognition device. Output device 830 can be any suitable device that provides output, such as a touchscreen, haptics device, or speaker.

Storage 840 can be any suitable device that provides storage, such as an electrical, magnetic, or optical memory, including a RAM, cache, hard drive, or removable storage disk. Communication device 860 can include any suitable device capable of transmitting and receiving signals over a network, such as a network interface chip or device. The components of the computer can be connected in any suitable manner, such as via a physical bus or wirelessly.

Software 850, which can be stored in storage 840 and executed by processor 810, can include, for example, the programming that embodies the functionality of the present disclosure (e.g., as embodied in the devices described above).

Software 850 can also be stored and/or transported within any non-transitory, computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 840, that can contain or store programming for use by or in connection with an instruction-execution system, apparatus, or device.

Software 850 can also be propagated within any transport medium for use by or in connection with an instruction-execution system, apparatus, or device, such as those described above, that can fetch instructions associated with the software from the instruction-execution system, apparatus, or device and execute the instructions. In the context of this disclosure, a transport medium can be any medium that can communicate, propagate, or transport programming for use by or in connection with an instruction-execution system, apparatus, or device. The transport readable medium can include, but is not limited to, an electronic, magnetic, optical, electromagnetic, or infrared wired or wireless propagation medium.

Device 800 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Device 800 can implement any operating system suitable for operating on the network. Software 850 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The foregoing description, for the purpose of explanation, has made reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments, with various modifications, that are suited to the particular use contemplated.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Therefore, according to the above, some examples of the disclosure are directed to an electronic device configured to decode quantized signals, the device comprising: a first decoder, wherein the first decoder is configured to: receive a first quantized collection of bits, wherein the first quantized collection of bits is based on data acquired by a first data source; select a first codeword from a first codebook based on the first received quantized collection of bits; and reconstruct the data acquired by the first data source using the selected first codeword; and a second decoder, wherein the second decoder is configured to receive a second quantized collection of bits, wherein the second quantized collection of bits is based on data acquired by a second data source, and wherein the data acquired by the first data source and the data acquired by the second data source are related; and select a codeword from a second codebook based on the second received quantized collection of bits and the first received quantized collection of bits, wherein the second codebook is based on the first codebook and a relationship between the first quantized collection of bits and the second quantized collection of bits. Additionally or alternatively to one or more of the examples disclosed above, in some examples the second codebook is generated during a training process, and wherein the training process comprises: receiving a first training sequence, wherein the first training sequence is based on the first data source; generating the first codebook based on the received training sequence; receiving a second training sequence, wherein the second training sequence is based on the second data source; determining an initial codebook based on the second training sequence; determining a first optimized quantizer based on the initial codebook; determining a first optimized codebook based on the determined first optimized quantizer; determining a second optimized quantizer based on the determined first optimized codebook; determining a second optimized codebook based on the determined second optimized quantizer; and generating the second codebook based on the second optimized codebook and the second optimized codebook. Additionally or alternatively to one or more of the examples disclosed above, in some examples, determining the initial codebook includes applying a Lloyd algorithm to the second training sequence. Additionally or alternatively to one or more of the examples disclosed above, in some examples, generating the first codebook includes applying a Lloyd algorithm to the first training sequence. Additionally or alternatively to one or more of the examples disclosed above, in some examples, the training process further comprises: converting the first training sequence into a first set of one or more image patches; and converting the second training sequence into a second set of or more image patches. Additionally or alternatively to one or more of the examples disclosed above, in some examples, the data acquired by the first source is transmitted at a higher rate than the data acquired by the second source. Additionally or alternatively to one or more of the examples disclosed above, in some examples, a number of bits of the first quantized collection of bits is greater than a number of bits of the second quantized collection of bits.

Some examples of the disclosure are directed to a method for creating a conditional codebook, the method comprising: receiving a first training sequence, wherein the first training sequence is based on a first data source; generating a first codebook based on the received first training sequence; receiving a second training sequence, wherein the second training sequence is based on a second data source; determining an initial codebook based on the second training sequence; determining a first optimized quantizer based on the initial codebook; determining a first optimized codebook based on the determined first optimized quantizer; determining a second optimized quantizer based on the determined first optimized codebook; determining a second optimized codebook based on the determined second optimized quantizer; and generating the second codebook based on the second optimized codebook and the second optimized codebook. Additionally or alternatively to one or more of the examples disclosed above, in some examples, the first data source and the second data source are statistically correlated. Additionally or alternatively to one or more of the examples disclosed above, in some examples, determining the initial codebook includes applying a Lloyd algorithm to the second training sequence. Additionally or alternatively to one or more of the examples disclosed above, in some examples, generating the first codebook includes applying a Lloyd algorithm to the first training sequence. Additionally or alternatively to one or more of the examples disclosed above, in some examples, the method comprises: converting the first training sequence into a first set of one or more image patches; and converting the second training sequence into a second set of or more image patches. Additionally or alternatively to one or more of the examples disclosed above, in some examples, the data acquired by the first source is transmitted at a higher rate than the data acquired by the second source. Additionally or alternatively to one or more of the examples disclosed above, in some examples, a number of bits of the first quantized collection of bits is greater than a number of bits of the second quantized collection of bits.

Some examples of the disclosure are directed to a method for decoding quantized signals, the method comprising:

receiving a first quantized collection of bits, wherein the first quantized collection of bits is based on data acquired by a first data source; selecting a first codeword from a first codebook based on the first received quantized collection of bits; reconstructing the data acquired by the first data source using the selected first codeword; receiving a second quantized collection of bits, wherein the second quantized collection of bits is based on data acquired by a second data source, and wherein the data acquired by the first data source and the data acquired by the second data source are related; and selecting a codeword from a second codebook based on the second received quantized collection of bits and the first received quantized collection of bits, wherein the second codebook is based on the first codebook and a relationship between the first quantized collection of bits and the second quantized collection of bits. Additionally or alternatively to one or more of the examples disclosed above, in some examples, the second codebook is generated during a training process, and wherein the training process comprises: receiving a first training sequence, wherein the first training sequence is based on the first data source; generating the first codebook based on the received training sequence; receiving a second training sequence, wherein the second training sequence is based on the second data source; determining an initial codebook based on the second training sequence; determining a first optimized quantizer based on the initial codebook; determining a first optimized codebook based on the determined first optimized quantizer; determining a second optimized quantizer based on the determined first optimized codebook; determining a second optimized codebook based on the determined second optimized quantizer; and generating the second codebook based on the second optimized codebook and the second optimized codebook. Additionally or alternatively to one or more of the examples disclosed above, in some examples, determining the initial codebook includes applying a Lloyd algorithm to the second training sequence. Additionally or alternatively to one or more of the examples disclosed above, in some examples, generating the first codebook includes applying a Lloyd algorithm to the first training sequence. Additionally or alternatively to one or more of the examples disclosed above, in some examples, the training process further comprises: converting the first training sequence into a first set of one or more image patches; and converting the second training sequence into a second set of or more image patches. Additionally or alternatively to one or more of the examples disclosed above, in some examples, the data acquired by the first source is transmitted at a higher rate than the data acquired by the second source. Additionally or alternatively to one or more of the examples disclosed above, in some examples, a number of bits of the first quantized collection of bits is greater than a number of bits of the second quantized collection of bits.

Some examples of the disclosure are directed to an electronic device configured to generate a conditional codebook, the device comprising: a processor, the processor configured to: receive a first training sequence, wherein the first training sequence is based on a first data source; generate a first codebook based on the received first training sequence; receive a second training sequence, wherein the second training sequence is based on a second data source; determine an initial codebook based on the second training sequence; determine a first optimized quantizer based on the initial codebook; determine a first optimized codebook based on the determined first optimized quantizer; determine a second optimized quantizer based on the determined first optimized codebook; determine a second optimized codebook based on the determined second optimized quantizer; and generate the second codebook based on the second optimized codebook and the second optimized codebook. Additionally or alternatively to one or more of the examples disclosed above, in some examples, the first data source and the second data source are statistically correlated. Additionally or alternatively to one or more of the examples disclosed above, in some examples, determining the initial codebook includes applying a Lloyd algorithm to the second training sequence. Additionally or alternatively to one or more of the examples disclosed above, in some examples, generating the first codebook includes applying a Lloyd algorithm to the first training sequence. Additionally or alternatively to one or more of the examples disclosed above, in some examples, the training process further comprises: converting the first training sequence into a first set of one or more image patches; and converting the second training sequence into a second set of or more image patches. Additionally or alternatively to one or more of the examples disclosed above, in some examples, the data acquired by the first source is transmitted at a higher rate than the data acquired by the second source. Additionally or alternatively to one or more of the examples disclosed above, in some examples, a number of bits of the first quantized collection of bits is greater than a number of bits of the second quantized collection of bits.

Some examples of the disclosure are directed to a non-transitory computer readable storage medium having stored thereon a set of instructions for decoding a quantized signal that when executed by a computing device, cause the computing device to: receive a first quantized collection of bits, wherein the first quantized collection of bits is based on data acquired by a first data source; select a first codeword from a first codebook based on the first received quantized collection of bits; reconstruct the data acquired by the first data source using the selected first codeword; receive a second quantized collection of bits, wherein the second quantized collection of bits is based on data acquired by a second data source, and wherein the data acquired by the first data source and the data acquired by the second data source are related; and select a codeword from a second codebook based on the second received quantized collection of bits and the first received quantized collection of bits, wherein the second codebook is based on the first codebook and a relationship between the first quantized collection of bits and the second quantized collection of bits. Additionally or alternatively to one or more of the examples disclosed above, in some examples, the second codebook is generated during a training process, and wherein the training process comprises: receiving a first training sequence, wherein the first training sequence is based on the first data source; generating the first codebook based on the received training sequence; receiving a second training sequence, wherein the second training sequence is based on the second data source; determining an initial codebook based on the second training sequence; determining a first optimized quantizer based on the initial codebook; determining a first optimized codebook based on the determined first optimized quantizer; determining a second optimized quantizer based on the determined first optimized codebook; determining a second optimized codebook based on the determined second optimized quantizer; and generating the second codebook based on the second optimized codebook and the second optimized codebook. Additionally or alternatively to one or more of the examples disclosed above, in some examples, determining the initial codebook includes applying a Lloyd algorithm to the second training sequence. Additionally or alternatively to one or more of the examples disclosed above, in some examples, generating the first codebook includes applying a Lloyd algorithm to the first training sequence. Additionally or alternatively to one or more of the examples disclosed above, in some examples, the training process further comprises: converting the first training sequence into a first set of one or more image patches; and converting the second training sequence into a second set of or more image patches. Additionally or alternatively to one or more of the examples disclosed above, in some examples, the data acquired by the first source is transmitted at a higher rate than the data acquired by the second source. Additionally or alternatively to one or more of the examples disclosed above, in some examples, a number of bits of the first quantized collection of bits is greater than a number of bits of the second quantized collection of bits.

Some examples of the disclosure are directed to non-transitory computer readable storage medium having stored thereon a set of instructions for creating a conditional codebook that when executed by a computing device, cause the computing device to: receive a first training sequence, wherein the first training sequence is based on a first data source; generate a first codebook based on the received first training sequence; receive a second training sequence, wherein the second training sequence is based on a second data source; determine an initial codebook based on the second training sequence; determine a first optimized quantizer based on the initial codebook; determine a first optimized codebook based on the determined first optimized quantizer; determine a second optimized quantizer based on the determined first optimized codebook; determine a second optimized codebook based on the determined second optimized quantizer; and generate the second codebook based on the second optimized codebook and the second optimized codebook. Additionally or alternatively to one or more of the examples disclosed above, in some examples, the first data source and the second data source are statistically correlated. Additionally or alternatively to one or more of the examples disclosed above, in some examples, determining the initial codebook includes applying a Lloyd algorithm to the second training sequence. Additionally or alternatively to one or more of the examples disclosed above, in some examples, generating the first codebook includes applying a Lloyd algorithm to the first training sequence. Additionally or alternatively to one or more of the examples disclosed above, in some examples, the computer is further caused to: convert the first training sequence into a first set of one or more image patches; and convert the second training sequence into a second set of or more image patches. Additionally or alternatively to one or more of the examples disclosed above, in some examples, the data acquired by the first source is transmitted at a higher rate than the data acquired by the second source. Additionally or alternatively to one or more of the examples disclosed above, in some examples, a number of bits of the first quantized collection of bits is greater than a number of bits of the second quantized collection of bits.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

What is claimed is:

1. An electronic device configured to decode quantized signals, the device comprising:

a first decoder, wherein the first decoder is configured to:
receive a first quantized collection of bits, wherein the first quantized collection of bits is based on data acquired by a first data source, and wherein the first quantized collection of bits represents a compressed first file;
select a first codeword from a first codebook based on the first received quantized collection of bits; and
reconstruct the data acquired by the first data source using the selected first codeword and the received first quantized collection of bits; and a second decoder, wherein the second decoder is configured to:
receive a second quantized collection of bits, wherein the second quantized collection of bits is based on data acquired by a second data source, wherein the first data source and second data source acquire data independently from one another, wherein the second quantized collection of bits represents a compressed second file, wherein an amount of compression of the compressed second file is greater than an amount of compression of the compressed first file, and wherein the data acquired by the first data source and the data acquired by the second data source are statistically correlated with respect to one another;
select a codeword from a second codebook based on the second received quantized collection of bits and the first received quantized collection of bits, wherein the second codebook is based on the first codebook and a relationship between the first quantized collection of bits and the second quantized collection of bits; and
reconstruct the data acquired by the second data source based on the received second quantized collection of bits and the selected second codeword.

2. The device of claim 1, wherein the second codebook is generated during a training process, and wherein the training process comprises:
receiving a first training sequence, wherein the first training sequence is based on the first data source;
generating the first codebook based on the received training sequence;
receiving a second training sequence, wherein the second training sequence is based on the second data source;
determining an initial codebook based on the second training sequence;
determining a first optimized quantizer based on the initial codebook;
determining a first optimized codebook based on the determined first optimized quantizer;
determining a second optimized quantizer based on the determined first optimized codebook;
determining a second optimized codebook based on the determined second optimized quantizer; and
generating the second codebook based on the second optimized codebook.

3. The device of claim 2, wherein determining the initial codebook includes applying a Lloyd algorithm to the second training sequence.

4. The device of claim 2, wherein generating the first codebook includes applying a Lloyd algorithm to the first training sequence.

5. The device of claim 2, wherein the training process further comprises:
converting the first training sequence into a first set of one or more image patches; and converting the second training sequence into a second set of or more image patches.

6. The device of claim 1, wherein the data acquired by the first source is transmitted at a higher rate than the data acquired by the second source.

7. The device of claim 6, wherein a number of bits of the first quantized collection of bits is greater than a number of bits of the second quantized collection of bits.

8. A method for creating a conditional codebook, the method comprising:
receiving a first training sequence, wherein the first training sequence is based on a first data source, and wherein the first training sequence is based on compressed data generated by the first data source;
generating a first codebook based on the received first training sequence;
receiving a second training sequence, wherein the second training sequence is based on a second data source, wherein the second training sequence is based on compressed data generated by the second data source, and wherein an amount of compression of the first data source is greater than an amount of compression of the second data source;
determining an initial codebook based on the second training sequence;
determining a first optimized quantizer based on the initial codebook;
determining a first optimized codebook based on the determined first optimized quantizer;
determining a second optimized quantizer based on the determined first optimized codebook;
determining a second optimized codebook based on the determined second optimized quantizer; and
generating the second codebook based on the second optimized codebook, wherein the first codebook is configured to reconstruct data generated by the first data source, and wherein the second codebook is configured to reconstruct data generated by the second data source.

9. The method of claim 8, wherein the first data source and the second data source are statistically correlated.

10. The method of claim 9, wherein determining the initial codebook includes applying a Lloyd algorithm to the second training sequence.

11. The method of claim 9, wherein generating the first codebook includes applying a Lloyd algorithm to the first training sequence.

12. The method of claim 9, wherein the method comprises:
converting the first training sequence into a first set of one or more image patches; and
converting the second training sequence into a second set of or more image patches.

13. The method of claim 8, wherein the data acquired by the first source is transmitted at a higher rate than the data acquired by the second source.

14. The method of claim 13, wherein a number of bits of the first quantized collection of bits is greater than a number of bits of the second quantized collection of bits.

15. A method for decoding quantized signals, the method comprising:
receiving a first quantized collection of bits, wherein the first quantized collection of bits is based on data acquired by a first data source, and wherein the first quantized collection of bits represents a compressed first file;
selecting a first codeword from a first codebook based on the first received quantized collection of bits;
reconstructing the data acquired by the first data source using the selected first codeword and the received first quantized collection of bits;
receiving a second quantized collection of bits, wherein the second quantized collection of bits is based on data acquired by a second data source, wherein the first data source and second data source acquire data independently from one another, wherein the second quantized collection of bits represent a compressed second file, wherein an amount of compression of the compressed second file is greater than an amount of compression of the compressed first file, and wherein the data acquired by the first data source and the data acquired by the second data source are statistically correlated with respect to one another; and
selecting a codeword from a second codebook based on the second received quantized collection of bits and the first received quantized collection of bits, wherein the second codebook is based on the first codebook and a relationship between the first quantized collection of bits and the second quantized collection of bits; and
reconstructing the data acquired by the second data source based on the received second quantized collection of bits and the selected second codeword.

16. The method of claim 15, wherein the second codebook is generated during a training process, and wherein the training process comprises:
receiving a first training sequence, wherein the first training sequence is based on the first data source;
generating the first codebook based on the received training sequence;
receiving a second training sequence, wherein the second training sequence is based on the second data source;
determining an initial codebook based on the second training sequence;
determining a first optimized quantizer based on the initial codebook;
determining a first optimized codebook based on the determined first optimized quantizer;
determining a second optimized quantizer based on the determined first optimized codebook;
determining a second optimized codebook based on the determined second optimized quantizer; and
generating the second codebook based on the second optimized codebook.

17. The method of claim 16, wherein determining the initial codebook includes applying a Lloyd algorithm to the second training sequence.

18. The method of claim 16, wherein generating the first codebook includes applying a Lloyd algorithm to the first training sequence.

19. The method of claim 16, wherein the training process further comprises:
converting the first training sequence into a first set of one or more image patches; and
converting the second training sequence into a second set of or more image patches.

20. The method of claim 15, wherein the data acquired by the first source is transmitted at a higher rate than the data acquired by the second source.

21. The method of claim 20, wherein a number of bits of the first quantized collection of bits is greater than a number of bits of the second quantized collection of bits.

22. An electronic device configured to generate a conditional codebook, the device comprising:

a processor, the processor configured to:
receive a first training sequence, wherein the first training sequence is based on a first data source, and wherein the first training sequence is based on compressed data generated by the first data source;
generate a first codebook based on the received first training sequence;
receive a second training sequence, wherein the second training sequence is based on a second data source, wherein the second training sequence is based on compressed data generated by the second data source, and wherein an amount of compression of the first data source is greater than an amount of compression of the second data source;
determine an initial codebook based on the second training sequence;
determine a first optimized quantizer based on the initial codebook;
determine a first optimized codebook based on the determined first optimized quantizer;
determine a second optimized quantizer based on the determined first optimized codebook;
determine a second optimized codebook based on the determined second optimized quantizer; and
generate the second codebook based on the second optimized codebook, wherein the first codebook is configured to reconstruct data generated by the first data source, and wherein the second codebook is configured to reconstruct data generated by the second data source.

23. The device of claim 22, wherein the first data source and the second data source are statistically correlated.

24. The device of claim 23, wherein determining the initial codebook includes applying a Lloyd algorithm to the second training sequence.

25. The device of claim 23, wherein generating the first codebook includes applying a Lloyd algorithm to the first training sequence.

26. The device of claim 23, wherein the training process further comprises:
converting the first training sequence into a first set of one or more image patches; and
converting the second training sequence into a second set of or more image patches.

27. The device of claim 22, wherein the data acquired by the first source is transmitted at a higher rate than the data acquired by the second source.

28. The device of claim 27, wherein a number of bits of the first quantized collection of bits is greater than a number of bits of the second quantized collection of bits.

29. A non-transitory computer readable storage medium having stored thereon a set of instructions for decoding a quantized signal that when executed by a computing device, cause the computing device to:
receive a first quantized collection of bits, wherein the first quantized collection of bits is based on data acquired by a first data source, and wherein the first quantized collection of bits represents a compressed first file;
select a first codeword from a first codebook based on the first received quantized collection of bits;
reconstruct the data acquired by the first data source using the selected first codeword and the received first quantized collection of bits;
receive a second quantized collection of bits, wherein the second quantized collection of bits is based on data acquired by a second data source, wherein the first data source and second data source acquire data independently from one another, wherein the second quantized collection of bits represents a compressed second file, wherein an amount of compression of the compressed second file is greater than an amount of compression of the compressed first file, and wherein the data acquired by the first data source and the data acquired by the second data source are statistically correlated with respect to one another; and
select a codeword from a second codebook based on the second received quantized collection of bits and the first received quantized collection of bits, wherein the second codebook is based on the first codebook and a relationship between the first quantized collection of bits and the second quantized collection of bits.

30. The non-transitory computer readable storage medium of claim 29, wherein the second codebook is generated during a training process, and wherein the training process comprises:
receiving a first training sequence, wherein the first training sequence is based on the first data source;
generating the first codebook based on the received training sequence;
receiving a second training sequence, wherein the second training sequence is based on the second data source;
determining an initial codebook based on the second training sequence;
determining a first optimized quantizer based on the initial codebook;
determining a first optimized codebook based on the determined first optimized quantizer;
determining a second optimized quantizer based on the determined first optimized codebook;
determining a second optimized codebook based on the determined second optimized quantizer; and
generating the second codebook based on the second optimized codebook.

31. The non-transitory computer readable storage medium of claim 30, wherein determining the initial codebook includes applying a Lloyd algorithm to the second training sequence.

32. The non-transitory computer readable storage medium of claim 30, wherein generating the first codebook includes applying a Lloyd algorithm to the first training sequence.

33. The non-transitory computer readable storage medium of claim 30, wherein the training process further comprises:
converting the first training sequence into a first set of one or more image patches; and
converting the second training sequence into a second set of or more image patches.

34. The non-transitory computer readable storage medium of claim 29, wherein the data acquired by the first source is transmitted at a higher rate than the data acquired by the second source.

35. The non-transitory computer readable storage medium of claim 34, wherein a number of bits of the first quantized collection of bits is greater than a number of bits of the second quantized collection of bits.

36. A non-transitory computer readable storage medium having stored thereon a set of instructions for creating a conditional codebook that when executed by a computing device, cause the computing device to:
receive a first training sequence, wherein the first training sequence is based on a first data source, and wherein the first training sequence is based on compressed data generated by the first data source;
generate a first codebook based on the received first training sequence;

receive a second training sequence, wherein the second training sequence is based on a second data source, wherein the second training sequence is based on compressed data generated by the second data source, and wherein an amount of compression of the first data source is greater than an amount of compression of the second data source;

determine an initial codebook based on the second training sequence;

determine a first optimized quantizer based on the initial codebook;

determine a first optimized codebook based on the determined first optimized quantizer;

determine a second optimized quantizer based on the determined first optimized codebook;

determine a second optimized codebook based on the determined second optimized quantizer; and generate the second codebook based on the second optimized codebook, wherein the first codebook is configured to reconstruct data generated by the first data source, and wherein the second codebook is configured to reconstruct data generated by the second data source.

37. The non-transitory computer readable storage medium of claim 36, wherein the first data source and the second data source are statistically correlated.

38. The non-transitory computer readable storage medium of claim 37, wherein determining the initial codebook includes applying a Lloyd algorithm to the second training sequence.

39. The non-transitory computer readable storage medium of claim 37, wherein generating the first codebook includes applying a Lloyd algorithm to the first training sequence.

40. The non-transitory computer readable storage medium of claim 37, wherein the computing system is caused to:

convert the first training sequence into a first set of one or more image patches; and convert the second training sequence into a second set of or more image patches.

41. The non-transitory computer readable storage medium of claim 36, wherein the data acquired by the first source is transmitted at a higher rate than the data acquired by the second source.

42. The non-transitory computer readable storage medium of claim 41, wherein a number of bits of the first quantized collection of bits is greater than a number of bits of the second quantized collection of bits.

* * * * *